United States Patent
Bennett et al.

(10) Patent No.: US 7,861,245 B2
(45) Date of Patent: *Dec. 28, 2010

(54) METHOD AND APPARATUS FOR FACILITATING RECOGNITION OF AN OPEN EVENT WINDOW DURING OPERATION OF GUEST SOFTWARE IN A VIRTUAL MACHINE ENVIRONMENT

(75) Inventors: Steven M. Bennett, Hillsboro, OR (US); Andrew V. Anderson, Hillsboro, OR (US); Erik Cota-Robles, Portland, OR (US); Stalinselvaraj Jeyasingh, Beaverton, OR (US); Alain Kagi, Portland, OR (US); Gilbert Neiger, Portland, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/494,110

(22) Filed: Jun. 29, 2009

(65) Prior Publication Data
US 2009/0265709 A1 Oct. 22, 2009

Related U.S. Application Data

(63) Continuation of application No. 10/816,233, filed on Mar. 31, 2004, now Pat. No. 7,620,949.

(51) Int. Cl.
*G06F 9/455* (2006.01)
*G06F 13/24* (2006.01)
*G06F 3/048* (2006.01)

(52) U.S. Cl. .............................. 718/1; 710/261; 715/759
(58) Field of Classification Search .................. 718/1; 710/261; 715/759
See application file for complete search history.

(56) References Cited

U.S. PATENT DOCUMENTS 3,699,532 A 10/1972 Schaffer et al.

(Continued)

FOREIGN PATENT DOCUMENTS

DE 4217444 12/1992

(Continued)

OTHER PUBLICATIONS

Keir Fraser, Steven Hand, Rolf Neugebauer, Ian Pratt, Andrew Warfield, Mark Williamson, Safe Hardware Access with Xen Virtual Machine Monitor, University of Cambridge Computer Laboratory, 2004.*

(Continued)

*Primary Examiner*—Emerson C Puente
*Assistant Examiner*—Camquy Truong
(74) *Attorney, Agent, or Firm*—Blakely, Sokoloff, Taylor & Zafman LLP (57) ABSTRACT

In one embodiment, a method includes transitioning control to a virtual machine (VM) upon receiving a request from a virtual machine monitor (VMM), determining that the request to transition control is associated with a request to be informed of an open event window, performing an event window check to determine whether an even window of the VM is open, and transitioning control to the VMM if the event window check indicates that the event window of the VM is open.

13 Claims, 5 Drawing Sheets

U.S. PATENT DOCUMENTS

| | | |
|---|---|---|
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne et al. |

| | | | |
|---|---|---|---|
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,496,847 B1 | 12/2002 | Bugnion et al. |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,717,589 B1 | 4/2004 | Grillo et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |
| 2005/0204357 A1 | 9/2005 | Garg et al. |

FOREIGN PATENT DOCUMENTS

| | | |
|---|---|---|
| EP | 0473913 | 3/1992 |
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| JP | 2000076139 | 3/2000 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9918511 | 4/1999 |
| WO | WO9957863 | 11/1999 |
| WO | WO9965579 | 12/1999 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175565 | 10/2001 |
| WO | WO0175595 | 10/2001 |
| WO | WO0201794 | 1/2002 |
| WO | WO9909482 | 1/2002 |
| WO | WO0217555 | 2/2002 |
| WO | WO 02/052404 A2 | 7/2002 |
| WO | WO02060121 | 8/2002 |
| WO | WO0175564 | 10/2002 |
| WO | WO02086684 | 10/2002 |
| WO | WO03058412 | 7/2003 |

OTHER PUBLICATIONS

PCT International Written Opinion for International Application No. PCT/US2005/010420, mailed Aug. 31, 2005, 8 pages.

PCT International Preliminary Report on Patentability for International Application No. PCT/US2005/010420, mailed Oct. 4, 2006, 9 pages.

Berg, Cliff, "How Do I Create a Signed Applet?", *Dr. Dobb's Journal*, (Aug. 1997),1-9.

Brands, Stefan, "Restrictive Blinding of Secret-Key Certificates", *Springer-Verlag* XP002201306, (1995),Chapter 3.

Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA (Apr. 21, 1999), 209-221.

Compaq Computer Corporation, "Trusted Computing Platform Alliance (TCPA) Main Specification Version 1.1a", XP002272822, (Jan. 25, 2001), 1-321.

Coulouris, George, et al., "Distributed Systems, Concepts and Designs", *2nd Edition*, (1994), 422-424.

Crawford, John, "Architecture of the Intel 80386", *Proceedings of the IEEE International Conference on Computer Design: VLSI in Computers and Processors (ICCD '86)*, (Oct. 6, 1986), 155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S., "Capability-Based Addressing", Fabry, R.S., *"Capability-Based Addressing," Communications of the ACM*, vol. 17, No. 7, (Jul. 1974), 403-412.

Frieder, Gideon "The Architecture and Operational Characteristics of the VMX Host Machine",*The Architecture and Operational Characteristics of the VMX Host Machine, IEEE*, (1982),9-16.

Goldberg, Robert P., "Survey of Virtual Machine Research", *Computer Magazine*, (Jun. 1974), 34-35.

Gong, Li, et al., "Going Beyond the Sandbox: an Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983), 530-544.

Hall, Judith S., et al., "Virtualizing the VAX Architecture," ACM SIGARCH Computer Archtitecture News, Proceedings of the 18th annual international symposium on Computer architecture, vol. 19, Issue No. 3, Apr. 1991, 10 pages.

Heinrich, Joe, "MIPS R4000 Microprocessor User's Manual, Second Edition", *Chapter 4 "Memory Management"*, (Jun. 11, 1993),61-97.

HP Mobile Security Overview, "HP Mobile Security Overview", (Sep. 2002), 1-10.

IBM, "Information Display Technique for a Terminate Stay Resident Program IBM Technical Disclosure Bulletin", TDB-ACC-No. NA9112156, vol. 34, Issue 7A, (Dec. 1, 1991),156-158.

IBM Corporation, "IBM ThinkPad T30 Notebooks", *IBM Product Specification*, located at -1.ibm.com/services/files/cisco_t30_spec_sheet_070202.pdf, last visited Jun. 23, 2004,(Jul. 2, 2002),1-6.

Intel, "IA-32 Intel Architecture Software Developer's Manual", vol. 3: *System Programming Guide*, Intel Corporation—2003,13-1 through 13-24.

Intel, "Intel386 DX Microprocessor 32-Bit CHMOS Microprocessor With Integrated Memory Management", (1995),5-56.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000), 1-6, 17-28.

Intel Corporation, "Intel IA-64 Architecture Software Developer's Manual", vol. 2: *IA-64 System Architecture*, Order No. 245318-001, (Jan. 2000), i, ii, 5.1-5.3, 11.1-11.8, 11.23-11.26.

Karger, Paul A, et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko, et al., "Design and Implementation of Dynamically Reconstructing System Software", *Software Engineering Conference*, Proceedings 1996 Asia-Pacific Seoul, South Korea 4-7 Dec. 1996, Los Alamitos, CA USA, IEEE Comput. Soc, US, ISBN 0-8186-7638-8,(1996).

Lawton, Kevin, et al., "Running Multiple Operating Systems Concurrently on an IA32 PC Using Virtualization Techniques", plex86.org/research/paper.txt, (Nov. 29, 1999),1-31.

Luke, Jahn, et al., "Replacement Strategy for Aging Avionics Computers", *IEEE AES Systems Magazine*, XP002190614, (Mar. 1999).

Menezes, Alfred J., et al., "Handbook of Applied Cryptography", *CRC Press LLC*, USA XP002201307, (1997), 475.

Menezes, Alfred J., et al., "Handbook of Applied Cryptography", *CRC Press Series on Discrete Mathematics and its Applications*, Boca Raton, FL, XP002165287, ISBN 08493855237, (Oct. 1996), 403-405, 506-515, 570.

Motorola, "M68040 User's Manual", (1993), 1-1 to 8-32.

Nanba, S., et al., "VM/4: ACOS-4 Virtual Machine Architecture", *VM/4: ACOS-4 Virtual Machine Architecture*, IEEE, (1985),171-178.

Search Report for International Application No. PCT/US2005/010420 mailed 8/31/05, 6 pages.

Richt, Stefan, et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000), 1-17.

Rosenblum, M., "Virtual Platform: A Virtual Machine Monitor for Commodity PC", *Proceedings of the 11th Hotchips Conference*, (Aug. 17, 1999),185-196.

RSA Security, "Hardware Authenticators", rsasecurity.com/node.asp?id=1158, 1-2.

RSA Security, "RSA SecurID Authenticators", rsasecurity.com/products/securid/datasheets/SID_DS_0103.pdf, 1-2.

RSA Security, "Software Authenticators",srasecurity.com/node.asp?id=1313, 1-2.

Saez, Sergio, et al., "A Hardware Scheduler for Complex Real-Time Systems", *Proceedings of the IEEE International Symposium on Industrial Electronics*, XP00219065,(Jul. 1999),43-48.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", 2nd Edition; *Wiley, John & Sons, Inc.*, XP002251738; ISBN 0471128457,(Nov. 1995),28-33; 176-177; 216-217; 461-473; 518-522.

Sherwood, Timothy, et al., "Patchable Instruction ROM Architecture", *Department of Computer Science and Engineering*, University of California, San Diego, La Jolla, CA, (Nov. 2001).

\* cited by examiner

METHOD AND APPARATUS FOR FACILITATING RECOGNITION OF AN OPEN EVENT WINDOW DURING OPERATION OF GUEST SOFTWARE IN A VIRTUAL MACHINE ENVIRONMENT

RELATED CASES

The present application is a continuation application of U.S. patent application Ser. No. 10/816,233, filed Mar. 31, 2004, now U.S. Pat. No. 7,620,949, entitled, "Method And Apparatus For Facilitating Recognition of An Open Event Window During Operation of Guest Software In A Virtual Machine Environment."

FIELD

Embodiments of the invention relate generally to virtual machines, and more specifically to facilitating recognition of an open event window during operation of guest software in a virtual machine environment.

BACKGROUND OF THE INVENTION

A closed interrupt window is a time interval during software execution when interrupts may not be delivered to the software. Alternatively, an open interrupt window is a time interval during software execution when interrupts can be delivered to the software. The opening and closing of the interrupt window may occur through a number of mechanisms.

The interrupt window may be closed because the software does not want to be interrupted. For example, an instruction set architecture (ISA) may allow software to block external interrupts through a masking bit or some other mechanism. In particular, in the ISA of the Intel® Pentium® 4 (referred to herein as the IA-32 ISA), hardware interrupts are blocked if the IF bit in the EFLAGS register is cleared. The IF bit may be set or cleared by instructions that load the EFLAGS register (e.g., POPF) or by instructions that explicitly set or clear the IF bit (e.g., STI, CLI). Additionally, certain machine transitions may make modifications to the IF bit (e.g., interrupt and exception vectoring may cause the IF bit to be cleared).

The interrupt window may be closed because the software is in the midst of a transition in machine state that precludes delivering the interrupt. In the IA-32 ISA, for example, because the proper vectoring of an interrupt requires the stack segment and stack pointer to remain consistent, the CPU may automatically block interrupt vectoring while the software update of the stack segment and stack pointer (MOVSS/POPSS) takes place. Additionally, the IA-32 ISA dictates that the execution of an STI instruction that sets the IF bit does not take effect until the instruction following the STI completes. Hence, the interrupt window opens one instruction after the STI.

Additional events, for example, non-maskable interrupts (NMIs), system management interrupts (SMIs), etc. may have similar event blocking semantics. A closed event window is a time interval during software execution when the associated event may not be delivered to the software. Alternatively, an open event window is a time interval during software execution when the associated event can be delivered to the software.

Depending on the specific ISA, the event window conditions may be rather complex, requiring evaluation of detailed information on the state of the processor to determine if software has an open event window for a given event.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

A method and apparatus for facilitating recognition of an open event window during operation of guest software is described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe detection of an open event window during operation of a virtual machine in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer. For example, a machine-readable medium includes a machine (e.g., a computer) readable storage medium (e.g., floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, etc.); a machine (e.g., computer) readable transmission medium (e.g., a transmission over the Internet, electrical, optical, acoustical or other forms of propagated signals (e.g., carrier waves, infrared signals, digital signals, etc.) or the like); etc.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Figure 1:
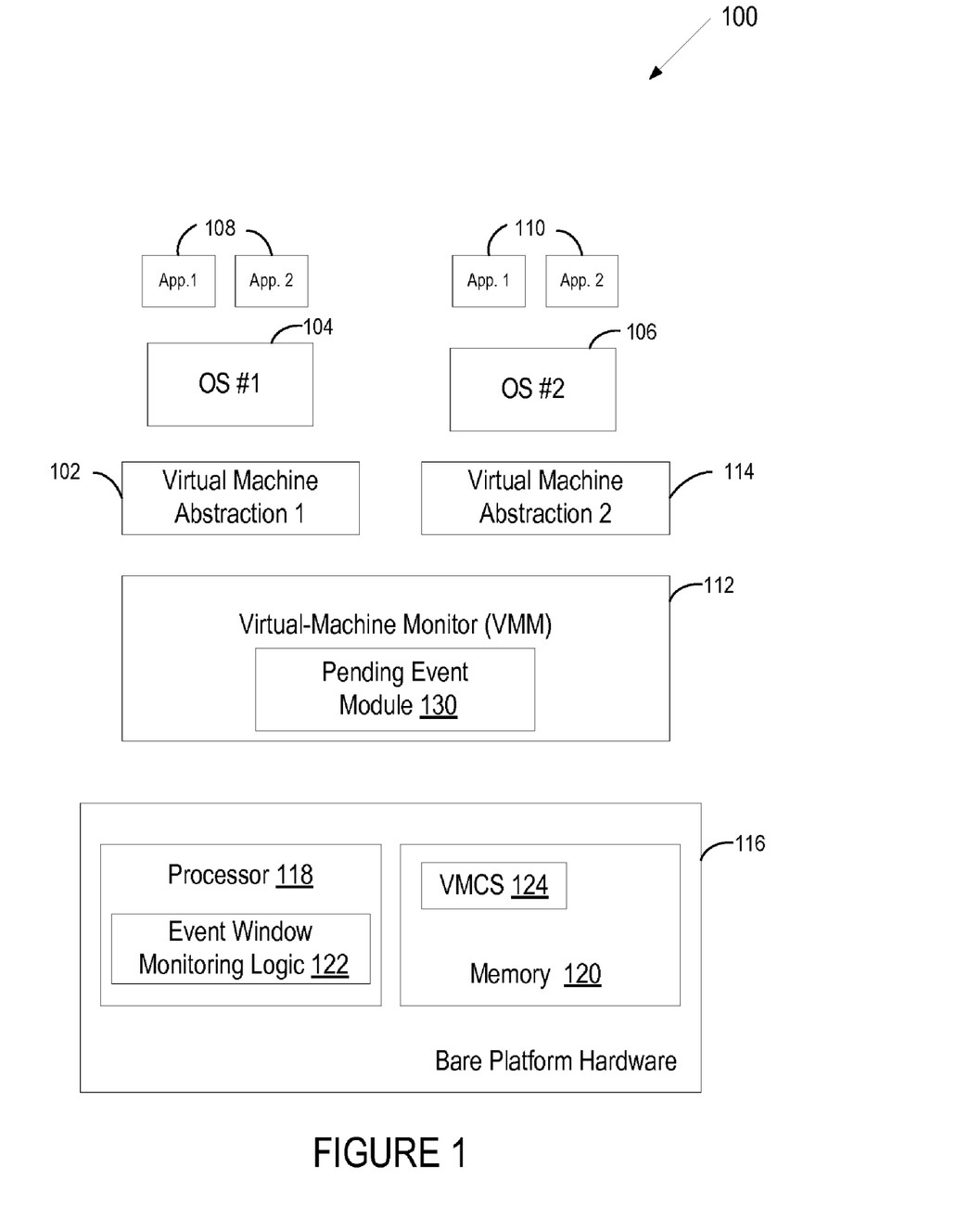
FIG. 1 illustrates one embodiment of a virtual-machine environment, in which the present invention may operate.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112.

The VMM 112, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 112 may be run within, or on top of, another VMM. VMMs may be implemented, for example, in hardware, software, firmware or by a combination of various techniques.

The platform hardware 116 can be of a personal computer (PC), mainframe, handheld device, portable computer, set-top box, or any other computing system. The platform hardware 116 includes a processor 118 and memory 120.

Processor 118 can be any type of processor capable of executing software, such as a microprocessor, digital signal processor, microcontroller, or the like. The processor 118 may include microcode, programmable logic or hardcoded logic for performing the execution of method embodiments of the present invention. Although FIG. 1 shows only one such processor 118, there may be one or more processors in the system.

Memory 120 can be a hard disk, a floppy disk, random access memory (RAM), read only memory (ROM), flash memory, any combination of the above devices, or any other type of machine medium readable by processor 118. Memory 120 may store instructions and/or data for performing the execution of method embodiments of the present invention.

The VMM 112 presents to other software (i.e., "guest" software) the abstraction of one or more virtual machines (VMs), which may provide the same or different abstractions to the various guests. FIG. 1 shows two VMs, 102 and 114. The guest software running on each VM may include a guest OS such as a guest OS 104 or 106 and various guest software applications 108 and 110. Each of the guest OSs 104 and 106 expect to access physical resources (e.g., processor registers, memory and I/O devices) within the VMs 102 and 114 on which the guest OS 104 or 106 is running and to perform other functions. For example, the guest OS expects to have access to all registers, caches, structures, I/O devices, memory and the like, according to the architecture of the processor and platform presented in the VM. The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed by guest software.

Further, each guest OS expects to handle various events such as exceptions (e.g., page faults, general protection faults, etc.), interrupts (e.g., hardware interrupts, software interrupts), and platform events (e.g., initialization (INIT) and system management interrupts (SMIs)). These exceptions, interrupts and platform events are referred to collectively and individually as "events" herein. Some of these events are "privileged" because they must be handled by the VMM 112 to ensure proper operation of VMs 102 and 114 and for protection from and among guest software.

When a privileged event occurs or guest software attempts to access a privileged resource, control may be transferred to the VMM 112. The transfer of control from guest software to the VMM 112 is referred to herein as a VM exit. After facilitating the resource access or handling the event appropriately, the VMM 112 may return control to guest software. The transfer of control from the VMM 112 to guest software is referred to as a VM entry.

In one embodiment, the processor 118 controls the operation of the VMs 102 and 114 in accordance with data stored in a virtual machine control structure (VMCS) 124. The VMCS 124 is a structure that may contain state of guest software, state of the VMM 112, execution control information indicating how the VMM 112 wishes to control operation of guest software, information controlling transitions between the VMM 112 and a VM, etc. The processor 118 reads information from the VMCS 124 to determine the execution environment of the VM and to constrain its behavior. In one embodiment, the VMCS is stored in memory 120. In some embodiments, multiple VMCS structures are used to support multiple VMs.

When the VMM 112 receives control following an event such as, for example, an interrupt (e.g., an interrupt occurred during the operation of the VMM 112 or an interrupt occurred during operation of a VM, resulting in a VM exit), the VMM 112 may handle the event itself or decide that the event should be handled by an appropriate VM. If the event should be handled by a VM, it may only be delivered when the VM is ready to receive the event (e.g., if the event is an interrupt, the VM has an open interrupt window). In one embodiment, the VMM 112 includes a pending event module 130 that is responsible for determining whether the VM's relevant event window is open and, if the relevant event window is not open, delaying the delivery of the event to the VM until the relevant event window opens.

In an embodiment, the pending event module 130 determines that the event window has opened upon receiving an indication from the processor 118. In one embodiment, the pending event module 130 uses the indication of the event window status to decide whether to deliver a pending event which requires an open event window, to the VM. In another embodiment, the pending event module 130 uses the indication of the event window status to facilitate functionality other than delivery of pending events which require an open event window. For example, the pending event module 130 may utilize information regarding the status of a VM's event window to make VM scheduling decisions (e.g., the VMM may choose not to switch to another VM at a scheduling point if the current VM has a closed interrupt window). Rather, the pending event module 130 may utilize the pending event indicator to generate a VM entry to the VM that will execute until the VM has an open event window, at which time the VMM 112 may choose to schedule another VM to execute.

In one embodiment, the processor 118 includes event window monitoring logic 122 that provides such an indication to the pending event module 130. In particular, once the pending event module 130 determines that the event window of the VM is closed, it sets a pending event indicator to a delivery value and requests a VM entry to this VM. In one embodiment, the pending event indicator is stored in the VMCS 124. There may be one or more such pending event indicators associated with one or more events. For example, the VMCS 124 may include a pending interrupt indicator and a pending SMI indicator, corresponding to interrupt and SMI events, respectively. Alternatively, the pending event indicator(s) may reside in the processor 118, a combination of the memory 120 and the processor 118, or in any other storage location or locations.

In response to the VM entry request, the event window monitoring logic 122 transitions control to the VM and starts monitoring the VM's relevant event window(s). Upon detecting that the VM's relevant event window is open, the event window monitoring logic 122 transfers control back to the VMM 112. In one embodiment, the event window monitoring logic 122 notifies the VMM 112 (e.g., using a designated reason code to indicate the source of the VM exit) that the VM exit was caused by an open event window. In an embodiment, there may be one such designated reason code for each event type.

In one embodiment, the event window monitoring logic 122 begins monitoring the state of the VM's event window upon executing a VM entry request issued by the VMM 112 and determining that the VM entry request is associated with a request to be informed of an open event window. In one embodiment, the event monitoring logic 122 determines whether the VM entry request is associated with a request to be informed of an open event window based on a current value of the pending event indicator. There may be one or more such pending event indicators, each corresponding to one or more events. For example, in an embodiment, there may be a pending interrupt indicator corresponding to interrupts and a pending SMI indicator corresponding to SMIs.

In one embodiment, the determination of whether the event window is open for interrupts is based on a current value of an interrupt flag that can be updated by guest software when the state of guest software's ability to accept interrupts changes. For example, in the IA-32 ISA, the EFLAGS register contains the IF interrupt flag bit, which, in part, controls whether an interrupt will be delivered to the software (as discussed above, in the IA-32 ISA, other factors that may block interrupts are considered in determining if the interrupt window is open). Alternatively, any other mechanism known in the art can be used to determine whether the interrupt window of the VM is open. Other events may have similar mechanisms for determining the state of the associated event window.

Once the VMM 112 receives an indication that the event window of the VM is open, the VMM 112, in an embodiment, requests the processor 118 to deliver the pending event to the VM. In another embodiment, the VMM 112 may deliver the event to the VM by emulating the delivery of the event in software (e.g., for interrupts, by accessing the VM's interrupt descriptor table, performing access and fault checks, etc.) and performing a VM entry to the guest such that execution begins with the first instruction of the VM's event handler. In yet another embodiment, the VMM 112 makes a scheduling decision based on the indication of an open the event window, as discussed above.

Figure 2:
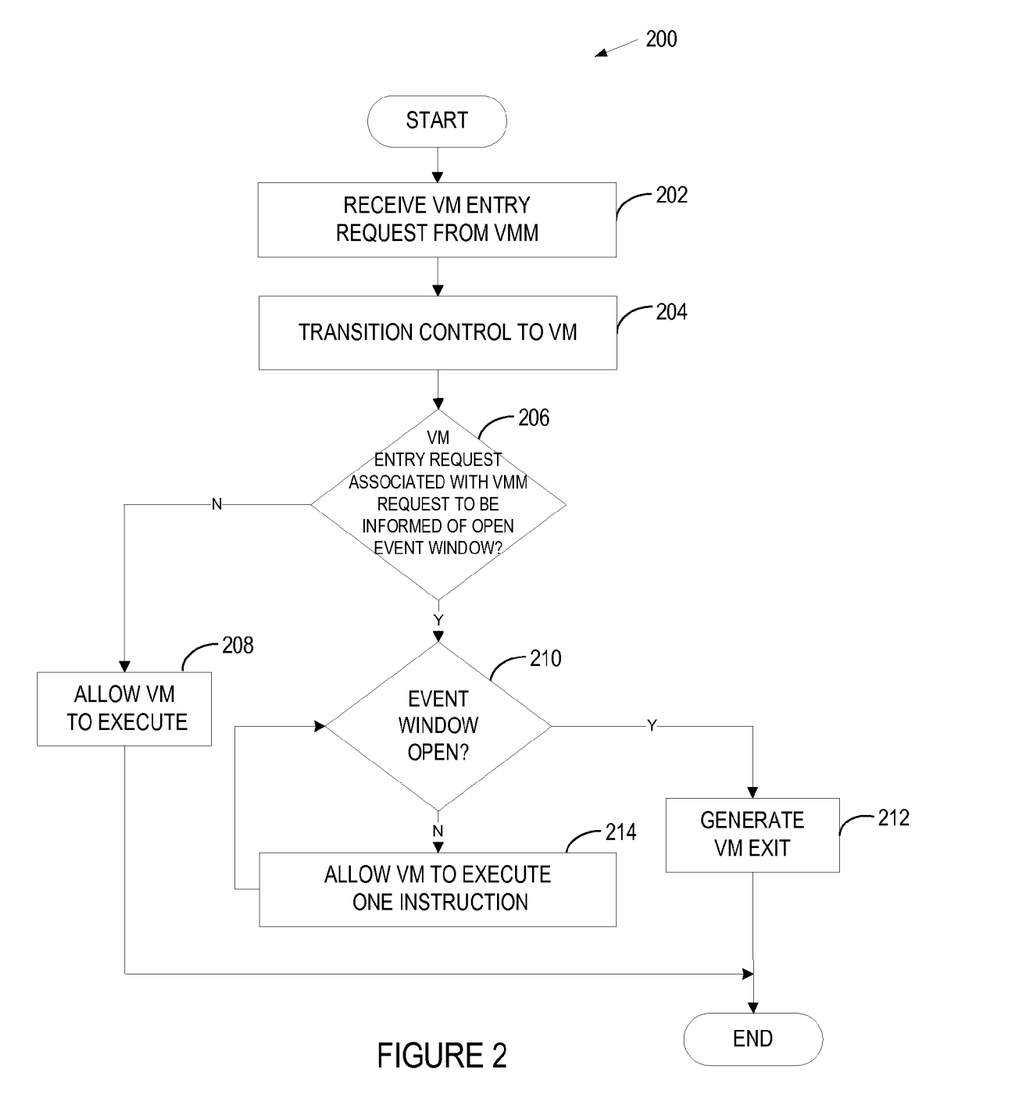
FIG. 2 is a flow diagram of one embodiment of a process for facilitating recognition of an open event window during operation of guest software.

FIG. 2 is a flow diagram of one embodiment of a process 200 for facilitating recognition of an open event window during operation of guest software. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 200 is performed by event window monitoring logic 122 of FIG. 1.

Referring to FIG. 2, process 200 begins with processing logic receiving a VM entry request from a VMM (processing block 202). In one embodiment, the VM entry request is received via a VM entry instruction executed by the VMM.

Next, processing logic transitions control to the VM (processing block 204) and determines whether the VM entry request is associated with a VMM request to be informed of an open event window (decision box 206). In one embodiment, processing logic determines whether the VM entry request is associated with a VMM request to be informed of an open event window by determining whether a pending event indicator is set to a delivery value.

If the VM entry request is not associated with a VMM request to be informed of an open event window, processing logic allows the VM to execute normally (i.e., to execute until a privileged event causes a VM exit, not shown in FIG. 2) (processing block 208).

If the VM entry request is associated with a VMM request to be informed of an open event window, processing logic performs an event window check to determine whether the VM's event window is open (e.g., for a pending interrupt, whether its interrupt window is open) (decision box 210). In one embodiment, processing logic performs the event window check before the VM executes any instructions. Alternatively, processing logic performs the event window check after the VM executes its first instruction.

If the event window check indicates that the VM's relevant event window is open, processing logic generates a VM exit (processing block 212) and, in one embodiment, informs the VMM (e.g., by providing a relevant reason code) that the VM exit is caused by an open event window.

If the event window check indicates that the VM's relevant event window is closed, processing logic allows the VM to execute an instruction (processing block 214) and returns to decision box 210 to perform the event window check again. This loop is repeated until processing logic determines that the VM's event window is open, or until another VM exit occurs (e.g., due to the VM's access of privileged state).

In some embodiments, the execution of a guest instruction may be interrupted by a fault (e.g., a page fault, a general protection fault, etc.). Some faults may cause a VM exit. For example, if the VMM requires VM exists on page faults to protect and virtualize the physical memory, then a page fault occurring during the execution of an instruction in the VM will result in a VM exit. Hence, a VM exit caused by a fault may occur prior to performing the event window check. In addition, certain conditions (e.g., INIT, SMI, etc.) may be evaluated after the execution of the VM instruction but before performing the event window check if these conditions have higher priority than the event window check. Some of these conditions may also cause a VM exit that will occur before the event window check is performed. When the VMM receives control due to a VM exit caused by an event other than the opening of the event window, the VMM may either check the state of the VM's event window itself or request a VM entry and wait for the processor's indication that the event window is opened, as will be discussed in more detail below.

Figure 3:
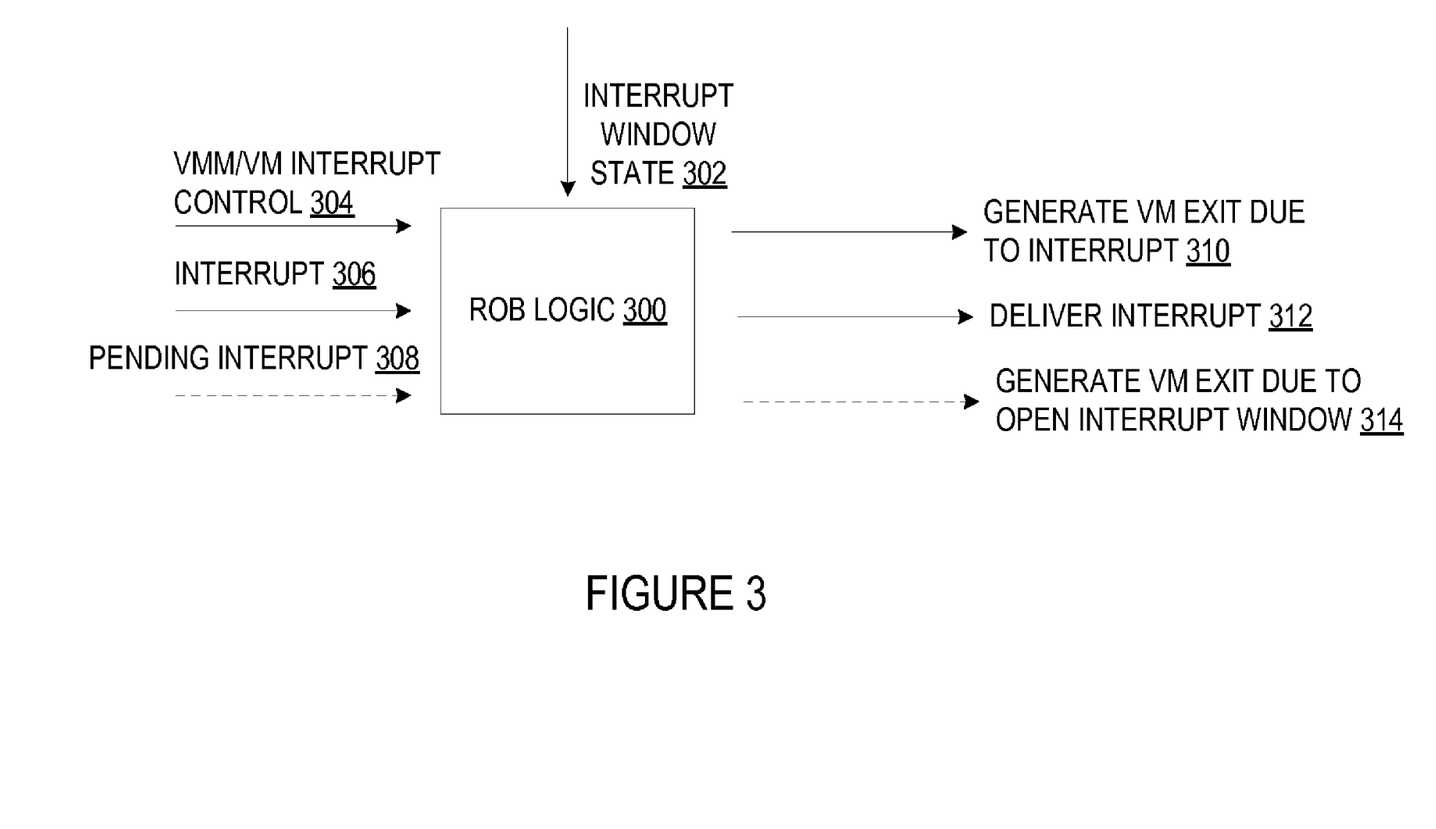
FIG. 3 illustrates simplified operation of reorder buffer logic, according to one embodiment of the present invention.

In one embodiment, pending event functionality has been implemented for interrupts by augmenting logic of a hardware reorder buffer (ROB). FIG. 3 illustrates simplified operation of ROB logic, according to one embodiment of the present invention.

Referring to FIG. 3, ROB logic 300 operates by receiving an interrupt window state signal 302, a VMM/VM interrupt control signal 304 and an interrupt signal 306. The interrupt window state signal 302 indicates whether the interrupt window of a currently operating VM is open. The interrupt signal 306 signals that a hardware interrupt is pending. For example, this signal may be tied directly or indirectly to the processor's hardware interrupt request (INTR) pin. In one embodiment, the interrupt signal 306 is provided by the interrupt controller coupled to the processor. The VMM/VM interrupt control signal 304 indicates whether interrupts are controlled by the VMM or the VM. In one embodiment, the VMM/VM interrupt control signal 304 is maintained by the VMM and stored in the VMCS.

If the VMM/VM control signal 304 indicates that the current interrupt is controlled by the VMM and the interrupt signal 306 signals an interrupt, the ROB logic 300 asserts a signal 310 indicating that a VM exit should occur due to the interrupt. This signal may trigger microcode, dedicated hardware or software to facilitate such a VM exit.

If the VMM/VM control signal 304 indicates that the current interrupt is controlled by the VM, the interrupt signal 306 signals an interrupt, and the interrupt window state signal 302 indicates that the VM's interrupt window is open, then the ROB logic 300 asserts a signal 312 indicating that an interrupt should be delivered to the VM. This signal may trigger microcode, dedicated hardware or software to facilitate the delivery of the interrupt to the VM.

In addition, the augmented ROB logic 300 receives as input a pending interrupt signal 308 that indicates whether there is a pending interrupt that should be delivered to a VM by the VMM. In one embodiment, the pending interrupt signal 308 is maintained by the VMM and stored in the VMCS. If the pending interrupt signal 308 indicates the existence of a pending interrupt and the interrupt window state signal 302 indicates that the VM's window is open, the ROB logic 300 asserts a signal 314 indicating that a VM exit should be generated due to an open interrupt window. This signal may trigger microcode, dedicated hardware or software to facilitate such a VM exit.

Table 1 provided below summarizes the inputs and outputs of ROB logic 300. In the embodiment shown, VM exits due to HW interrupts have priority over VM exits due to an open interrupt window. Both VM exit sources have priority over the delivery of interrupts to the VM. Other embodiments may have a different prioritization of these events. In the table, an "X" indicates a don't-care value (it may be 1 or 0); a 1 in the table indicates that the signal is asserted.

TABLE 1

| ROB logic (300) Inputs | | | | ROB logic (300) Outputs | | |
|---|---|---|---|---|---|---|
| IntCont | HW Int | | | | | |
| (signal 304) 1 = VMM 0 = VM | (signal 306) 1 = Int Asserted | Pend. Int (signal 308) | Win. Open (signal 302) | VM-exit-int (signal 310) | VM-exit-OIW (signal 314) | Deliver int to VM (signal 312) |
| X | 0 | 0 | X | 0 | 0 | 0 |
| 0 | 0 | 1 | 0 | | | |
| 0 | 1 | 1 | 0 | | | |
| 0 | 1 | 0 | 0 | | | |

TABLE 1-continued

| ROB logic (300) Inputs | | | | ROB logic (300) Outputs | | |
|---|---|---|---|---|---|---|
| IntCont (signal 304) 1 = VMM 0 = VM | HW Int (signal 306) 1 = Int Asserted | Pend. Int (signal 308) | Win. Open (signal 302) | VM-exit-int (signal 310) | VM-exit-OIW (signal 314) | Deliver int to VM (signal 312) |
| 1 | 0 | 1 | 0 | | | |
| 1 | 1 | X | X | 1 | 0 | 0 |
| 0 | 0 | 1 | 1 | 0 | 1 | 0 |
| 0 | 1 | 1 | 1 | | | |
| 1 | 0 | 1 | 1 | | | |
| 0 | 1 | 0 | 1 | 0 | 0 | 1 |

Figure 4:
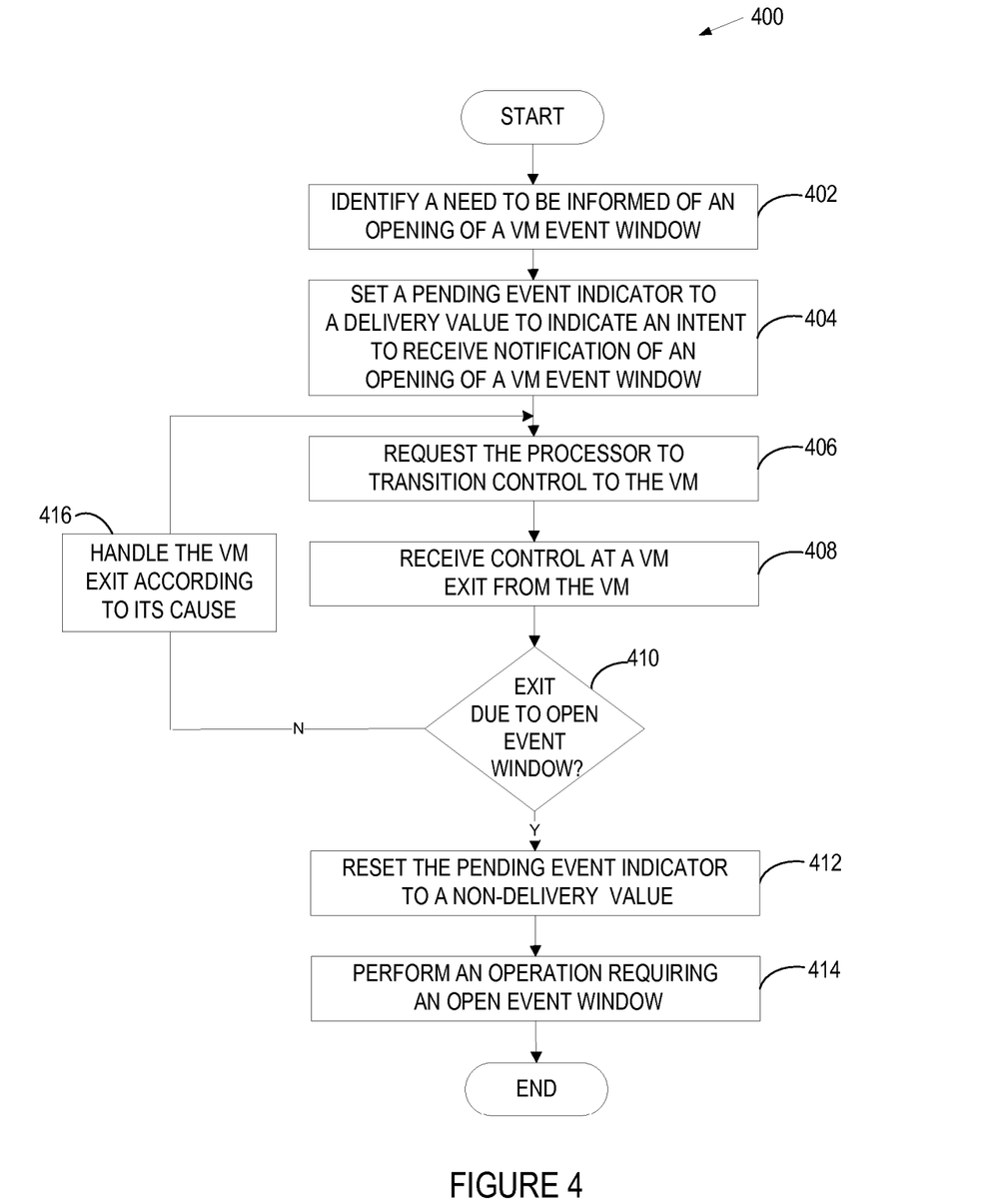
FIG. 4 is a flow diagram of one embodiment of a process for determining the status of an event window of a VM.

FIG. 4 is a flow diagram of one embodiment of a process 400 for determining the status of an event window of a VM. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 400 is performed by a pending event module 130 of FIG. 1.

Referring to FIG. 4, process 400 begins with processing logic identifying a need to be informed of an opening of a VM event window (processing block 402). As discussed above, such information may be needed to determine when to deliver a pending event to a VM, to make a scheduling decision, or for any other reason.

At processing block 404, processing logic sets a pending event indicator to a delivery value to indicate an intent to receive notification of an opening of a VM event window. In one embodiment, the pending event indicator is contained in the VMCS.

At processing block 406, processing logic requests the processor to transition control to the VM. In an embodiment, the request to transition control is sent to the processor by execution of a VM entry instruction.

Subsequently, processing logic receives control at a VM exit from the VM (processing block 408) and determines (e.g., based on a reason code associated with the VM exit) whether the VM exit was due to the opening of the VM's event window (decision box 410). If so, processing logic resets the pending event indicator to a non-delivery value (processing block 412) and performs an operation requiring an open event window (e.g., delivery of a pending event to the VM) (processing block 414).

If the VM exit was not caused by the opening of the event window, processing logic handles the VM exit according to its cause (processing block 416), and returns to processing block 408 to request a VM entry to the VM.

Figure 5:
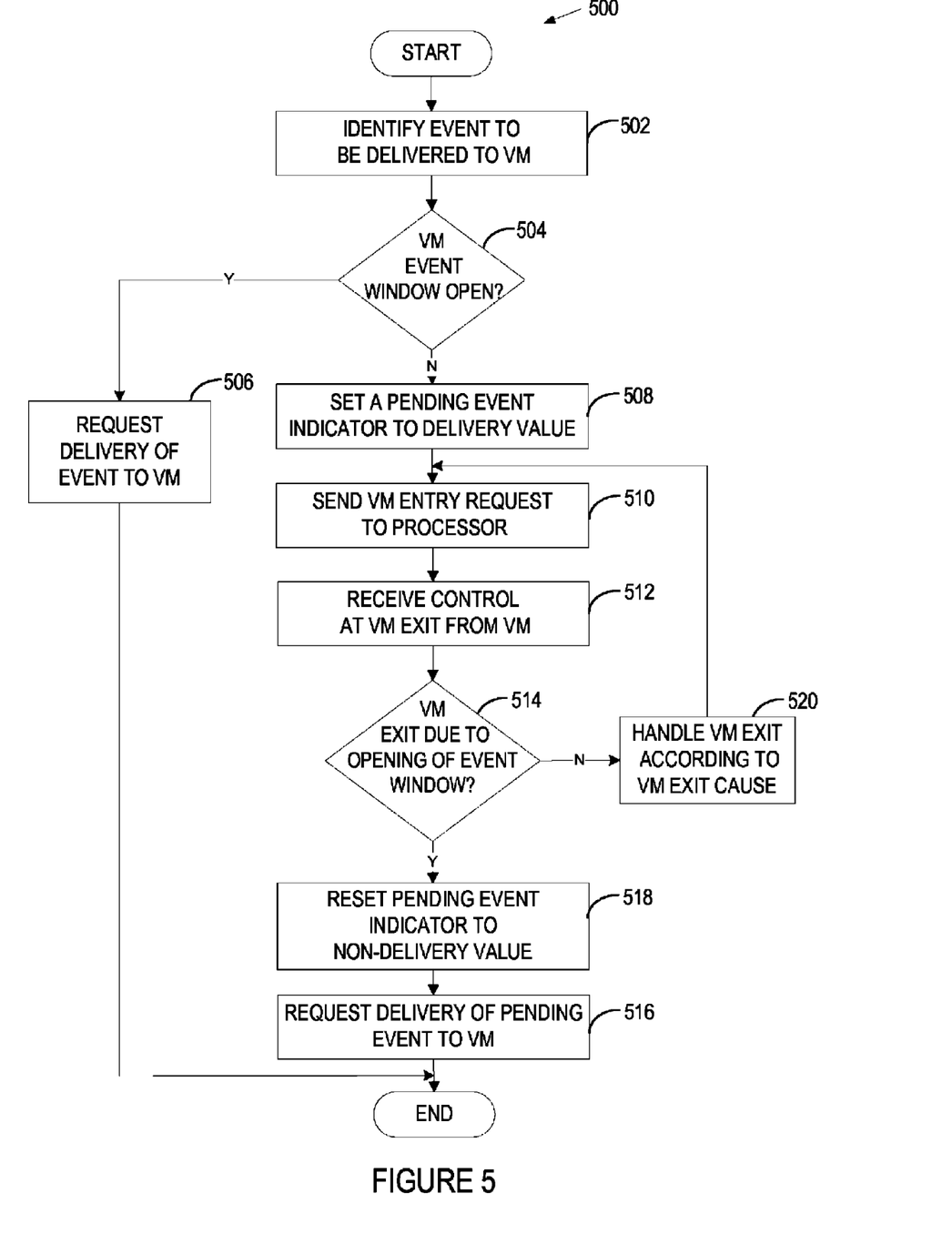
FIG. 5 is a flow diagram of one embodiment of a process for delivering an event to guest software.

FIG. 5 is a flow diagram of one embodiment of a process 500 for delivering a pending event to a VM. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 400 is performed by a pending event module 130 of FIG. 1.

Process 500 begins with processing logic identifying an event that should be delivered to a VM (processing block 502) and determining whether the corresponding event window of this VM is open (processing block 504). For example, if the event that should be delivered to the VM is an interrupt, processing logic checks the state of the VM's interrupt window.

If the event window is open, processing logic, in one embodiment, requests the processor to deliver the event to the VM (processing block 506). This request may be part of a VM entry request initiated by execution of a VM entry instruction. In another embodiment, the VMM may emulate the delivery of the event to the VM using software techniques and perform a VM entry to the VM such that the first instruction to be executed will be the first instruction of the VM's event handler.

If the event window is not open, processing logic sets a pending event indicator to a delivery value for the pending event (processing block 508). For example, if there is a single bit in the VMCS for the pending event indicator, processing logic may set it to an asserted value (e.g., set to 1). Next, processing logic sends a VM entry request to the processor (processing block 510). In an embodiment, the pending event indicator is a bit in the VMCS. In an embodiment, the VM entry request is sent to the processor by execution of a VM entry instruction.

Subsequently, processing logic receives control at a VM exit from the VM (processing block 512) and determines (e.g., based on a reason code associated with the VM exit) whether the VM exit was due to the opening of the VM's event window (decision box 514). If so, processing logic resets the pending event indicator to a non-delivery value (processing block 518) and requests the processor to deliver the pending event to the VM (processing block 516). This request may be part of a VM entry request initiated by execution of a VM entry instruction. In another embodiment, the VMM may emulate the delivery of the pending event to the VM using software techniques. If the VM exit was not caused by the opening of the event window, processing logic handles the VM exit according to its cause (processing block 520), and, in one embodiment, returns to processing block 510 to request a VM entry to the VM. In response to this request, the processor transitions control to the VM and checks whether the VM's event window is open before the first VM instruction executes.

In another embodiment, processing logic determines whether the VM's event window is open after handling the VM exit at processing block 520, and returns to processing block 510 upon determining that the VM's event window is closed. Processing logic may make this determination by examining relevant state of the VM. For example, for a pending interrupt, processing logic may examine the IF bit in the EFLAGS register, as well as other state indicating the state of the interrupt window in the VM. In this embodiment, the processor responds to the VM entry request by transitioning control to the VM, allowing the VM to execute its first instruction and then checking whether the VM's event window is open.

In one embodiment, processing logic performs an additional check to determine whether the VM's event window is open only if the preceding VM exit was caused by an event having a higher priority than the opening of the event window. In other words, processing logic performs an additional event window check only if it is possible that the opening of the event window was unnoticed by the processor due to a higher priority event that caused a VM exit.

As discussed above, in an alternative embodiment, a VMM may utilize the pending event indicator to facilitate functionality other than delivery of pending events which require an open event window. For example, such a VMM may utilize information regarding the status of a VM's event window to make VM scheduling decisions (e.g., the VMM may choose not to switch to another VM at a scheduling point if the current VM has a closed interrupt window). Such a VMM may utilize the pending event indicator to generate a VM entry to the VM that will execute until the VM has an open event window, at which time a VM exit will be generated and control will transition to the VMM. Following this VM exit, the VMM may choose to schedule another VM to execute.

Thus, a method and apparatus for facilitating recognition of an open event window during operation of guest software in a virtual machine environment have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising a processor to:
   receive a request to transition control from a virtual machine monitor (VMM) to a virtual machine (VM);
   determine that the request to transition control is associated with a request to be informed of an open event window of the VM, based on accessing a pending event indicator maintained by the VMM and determining that the pending event indicator maintained by the VMM is set to a delivery value;
   transition control to the VM in response to the request to transition control to the VM From the VMM;
   perform an event window check to determine whether an event window of the VM is open;
   transition control to the VMM if the event window check indicates that the event window of the VM is open; and
   if the VM does not have an open event window, repeat the event window check after each instruction executed by the VM until determining that the VM has the open event window.

2. The apparatus of claim 1, wherein the processor further to:
   inform the VMM that control is transitioned to the VMM due to an open event window of the VM.

3. The apparatus of claim 1, wherein the event window check is initially performed before the VM executes any instructions.

4. The apparatus of claim 1, wherein the event window check is initially performed after the VM executes any instructions.

5. The apparatus of claim 1, wherein the processor further to perform the following prior to determining that the VM has an open event window:
   detect a higher priority event associated with a transition of control to the VMM, transition control to the VMM; and
   inform the VMM that control is transitioned due to the higher priority event.

6. A processor, comprising:
   an interrupt request pin to receive a hardware interrupt signal input; and
   a hardware reorder buffer (ROB) logic, connected with the hardware interrupt request pin, to receive an interrupt window state signal input, an interrupt control signal input and at least one of the hardware interrupt signal input or a pending interrupt signal input, wherein the interrupt window state signal input indicates whether an interrupt window of a virtual machine (VM) is open, the interrupt control signal input indicates whether a pending interrupt is controlled by the VM or by a virtual machine monitor (VMM), the hardware interrupt signal input indicates that the pending interrupt is a hardware interrupt, and the pending interrupt signal input indicates that the pending interrupt is ready to be delivered to the VM by the VMM;
   the ROB logic to assert a first signal output when the hardware interrupt signal input is received, the interrupt control signal input indicates that the pending interrupt is controlled by the VM, and the interrupt window state signal input indicates that the VM's interrupt window is open, the first signal output indicating that a VM entry is to be generated, wherein the VM entry causes a transition of control from the VMM to the VM;
   the ROB logic to assert a second signal output when the interrupt window state signal input indicates that the VM's interrupt window is open and the pending interrupt signal input is received, the second signal output indicating that a VM exit is to be generated due to the open interrupt window, wherein the VM exit causes a transition of control from the VM to the VMM.

7. The processor of claim 6, further comprising:
   the ROB logic to assert a third signal output when the hardware interrupt signal input is received and the interrupt control signal input indicates that the pending interrupt is controlled by the VMM, wherein the third signal output indicates that a VM exit is to occur due to the hardware interrupt signal input.

8. The processor of claim 7, wherein VM exits due to hardware interrupts have priority over VM exits due to an open interrupt window.

9. The processor of claim 7, wherein both VM exits due to hardware interrupts and VM exits due to an open interrupt window have priority over the delivery of interrupts to the VM.

10. A method for a processor, comprising:
    receiving an interrupt window state signal input by a hardware reorder buffer (ROB) logic, wherein the interrupt window state signal input indicates whether an interrupt window of a virtual machine (VM) is open;
    receiving an interrupt control signal input by the ROB logic, wherein the interrupt control signal input indicates whether interrupts are controlled by the VM or by a virtual machine monitor (VMM);
    receiving at least one of a hardware interrupt signal input or a pending interrupt signal input by the ROB logic, wherein the hardware interrupt signal input indicates that a pending interrupt is a hardware interrupt, and the pending interrupt signal input indicates that the pending interrupt is ready to be delivered to the VM by the VMM;

asserting a first signal output when the hardware interrupt signal input is received, the interrupt control signal input indicates that the pending interrupt is controlled by the VM, and the interrupt window state signal input indicates that the VM's interrupt window is open, the first signal output indicating that a VM entry is to be generated, wherein the VM entry causes a transition of control from the VMM to the VM; and asserting a second signal output when the interrupt window state signal input indicates that the VM's interrupt window is open and the pending interrupt signal input is received, the second signal output indicating that a VM exit is to be generated due to the open interrupt window, wherein the VM exit causes a transition of control from the VM to the VMM.

11. The method of claim 10, further comprising:

asserting a third signal output when the hardware interrupt signal input is received and the interrupt control signal input indicates that the pending interrupt is controlled by the VMM, wherein the third signal output indicates that a VM exit is to occur due to the hardware interrupt signal input.

12. The method of claim 11, wherein VM exits due to hardware interrupts have priority over VM exits due to an open interrupt window.

13. The method of claim 12, wherein both VM exits due to hardware interrupts and VM exits due to an open interrupt window have priority over the delivery of interrupts to the VM.

* * * * *